(12) United States Patent
Sasaki et al.

(10) Patent No.: US 11,097,914 B2
(45) Date of Patent: Aug. 24, 2021

(54) MEDIUM CONVEYING DEVICE, RECORDING DEVICE, AND METHOD FOR DETERMINING SKEWING STATE OF CONVEYANCE BELT

(71) Applicant: SEIKO EPSON CORPORATION, Tokyo (JP)

(72) Inventors: Tsutomu Sasaki, Matsumoto (JP); Takahiro Yamashita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 351 days.

(21) Appl. No.: 16/357,730

(22) Filed: Mar. 19, 2019

(65) Prior Publication Data
US 2019/0291990 A1   Sep. 26, 2019

(30) Foreign Application Priority Data

Mar. 20, 2018  (JP) .............................. JP2018-052140

(51) Int. Cl.
*B65H 7/02* (2006.01)
*B65H 5/02* (2006.01)
(Continued)

(52) U.S. Cl.
CPC .............. *B65H 7/02* (2013.01); *B41J 11/007* (2013.01); *B41J 13/08* (2013.01); *B41J 15/048* (2013.01);
(Continued)

(58) Field of Classification Search
CPC ...... B65H 7/02; B65H 23/0204; B65H 20/06; B65H 5/021; B65H 2403/942;
(Continued)

(56) References Cited

U.S. PATENT DOCUMENTS

| 5,471,289 A | * | 11/1995 | Satoh | B65G 39/16 |
| | | | | 198/806 |
| 5,515,139 A | * | 5/1996 | Hou | B65G 39/16 |
| | | | | 198/807 |

(Continued)

FOREIGN PATENT DOCUMENTS

| JP | 2007001138 A | * | 1/2007 |
| JP | 2010-064809 A |   | 3/2010 |

OTHER PUBLICATIONS

"EPO, European Search Report EP 19 16 4156" (Year: 2019).*

*Primary Examiner* — Mark A Deuble
(74) *Attorney, Agent, or Firm* — Workman Nydegger

(57) ABSTRACT

There is provided a medium conveying device which includes a conveyance belt passed around a first roller and a second roller and configured to support and convey a medium on a supporting surface, and in which a controlling unit is able to execute first control to determine whether a first skewing direction and a second skewing direction are the same, the first skewing direction indicating whether, when the first roller and the second roller are caused to rotate in the first rotational direction, the conveyance belt moves toward one side or the other side in a width direction intersecting a moving direction of the conveyance belt, and the second skewing direction indicating whether, when the first roller and the second roller are caused to rotate in the second rotational direction, the conveyance belt moves toward the one side or the other side in the width direction.

10 Claims, 12 Drawing Sheets

(51) Int. Cl.
- *B41J 11/00* (2006.01)
- *B65H 23/02* (2006.01)
- *B65G 39/16* (2006.01)
- *B65H 20/06* (2006.01)
- *B41J 15/04* (2006.01)
- *B65G 15/64* (2006.01)
- *B41J 13/08* (2006.01)
- *B65G 43/02* (2006.01)

(52) U.S. Cl.
CPC ............ *B65G 15/64* (2013.01); *B65G 39/16* (2013.01); *B65H 5/021* (2013.01); *B65H 20/06* (2013.01); *B65H 23/0204* (2013.01); *B65G 43/02* (2013.01); *B65H 2301/331* (2013.01); *B65H 2403/942* (2013.01)

(58) Field of Classification Search
CPC .......... B65H 2301/331; B65H 2557/61; B65G 15/64; B65G 39/16; B65G 43/02; B41J 13/08; B41J 11/007; B41J 15/048
USPC .................................................. 198/806–807
See application file for complete search history.

(56) References Cited

U.S. PATENT DOCUMENTS

| | | | |
|---|---|---|---|
| 6,134,406 A * | 10/2000 | Moe ........................ | B65G 39/16 347/116 |
| 2006/0119029 A1* | 6/2006 | Kitamura ............... | B41J 11/007 271/275 |
| 2006/0215008 A1* | 9/2006 | Kibayashi ................ | B41J 2/155 347/104 |
| 2008/0044211 A1* | 2/2008 | Otomo ................. | G03G 15/755 399/395 |
| 2013/0206549 A1* | 8/2013 | Clevers .................. | B41J 11/007 198/807 |
| 2013/0222456 A1* | 8/2013 | Ogawa ................... | B41J 11/007 347/16 |
| 2014/0353126 A1* | 12/2014 | Sengoku ................ | B41J 11/007 198/806 |

* cited by examiner

MEDIUM CONVEYING DEVICE, RECORDING DEVICE, AND METHOD FOR DETERMINING SKEWING STATE OF CONVEYANCE BELT

BACKGROUND

1. Technical Field

The invention relates to a medium conveying device configured to convey a medium by using a conveyance belt, a recording device configured to record on the medium conveyed by the medium conveying device, and a method for determining a skewing state of the conveyance belt in the medium conveying device.

2. Related Art

There is a medium conveying device configured to convey a sheet-shaped medium and including a configuration, for example, in which a belt is passed around two rollers, and the rollers are caused to rotate to cause the belt to rotate to convey the medium supported on the belt.

In such a medium conveying device, when the two rollers around which the belt is passed are not in parallel to each other, there has been an issue of belt skewing in which, at the time of rotation, the belt moves toward one side in a width direction intersecting a moving direction of the belt. When the belt skewing occurs, diagonal travel (also referred to as skewing) of the medium conveyed tends to occur.

In particular, in the case of a large-sized medium conveying device, two rollers are more likely to be misaligned from a parallel state when the rollers are installed in a simple manner, and the issue of the diagonal travel of the medium may become significant.

To address this issue, JP-A-2010-64809 discloses a medium conveying device including adjustment means configured to adjust belt skewing.

In JP-A-2010-64809, the adjustment means (belt-meandering adjustment means 5) is configured to be capable of moving a roller on one side (end roller 6) in a front and rear direction along a conveying direction of an article.

However, misalignment from a parallel state of two rollers not only includes misalignment of the rollers in the conveying direction but also may include misalignment of the rollers in a vertical direction relative to a medium supporting surface of a belt. The adjustment means described in JP-A-2010-64809 can only adjust the misalignment of the rollers along the conveying direction.

SUMMARY

The invention has been made in view of the situation described above, and an advantage of some aspects of the invention is to provide a medium conveying device using a belt, in which adjustment of belt skewing is appropriately performed to suppress skewing of a medium.

To achieve the above advantage, a medium conveying device according to a first aspect of the invention, includes a first roller configured to be rotatable in a first rotational direction and in a second rotational direction opposite to the first rotational direction, a second roller disposed to be spaced apart from the first roller and configured to be rotatable in the first rotational direction and in the second rotational direction, a conveyance belt passed around the first roller and the second roller and configured to support and convey a medium on a supporting surface formed between the first roller and the second roller, and a controlling unit configured to control rotary drive of at least the first roller, and in the medium conveying device, the controlling unit is configured to execute first control to determine whether a first skewing direction and a second skewing direction are the same, the first skewing direction indicating whether, when the first roller and the second roller are caused to rotate in the first rotational direction, the conveyance belt moves toward one side or the other side in a width direction intersecting a moving direction of the conveyance belt, and the second skewing direction indicating whether, when the first roller and the second roller are caused to rotate in the second rotational direction, the conveyance belt moves toward the one side or the other side in the width direction.

When skewing occurs in the conveyance belt, the first roller and the second roller may be misaligned from a parallel state between the first roller and the second roller. The misalignment from a parallel state between the first roller and the second roller includes a case where both shaft ends of each of the rollers are located on the same plane, but the first roller and the second roller are not in parallel to each other, and a case where one shaft end of both the shaft ends of each of the rollers and the other three shaft ends are not located on the same plane, that is, the first roller and the second roller are in a twist-position relationship.

Herein, the former is also referred to as a state of "in-plane misalignment", and the latter is also referred to as a state of "out-of-plane misalignment".

According to this aspect, the controlling unit is able to execute the first control to determine whether the first skewing direction and the second skewing direction are the same, the first skewing direction indicating whether, when the first roller and the second roller are caused to rotate in the first rotational direction, the conveyance belt moves toward one side or the other side in the width direction intersecting the moving direction of the conveyance belt, and the second skewing direction indicating whether, when the first roller and the second roller are caused to rotate in the second rotational direction, the conveyance belt moves toward the one side or the other side in the width direction. Thus, it is possible to detect whether the misalignment from a parallel state between the first roller and the second roller includes the out-of-plane misalignment.

More specifically, in a case where the first roller and the second roller are caused to rotate in the first rotational direction and in the second rotational direction, when the first skewing direction and the second skewing direction are the same, it is possible to determine that the state does not include the out-of-plane misalignment (state including only the in-plane misalignment), and in addition, when the first skewing direction and the second skewing direction are different directions, it is possible to determine that the state includes the out-of-plane misalignment.

According to a second aspect of the invention, in the first aspect, the medium conveying device includes a belt detecting unit configured to detect movement of the conveyance belt in the width direction, and in the medium conveying device, the controlling unit obtains information about the first skewing direction and the second skewing direction based on a result of detection by the belt detecting unit to execute the first control.

According to this aspect, the controlling unit obtains information about the first skewing direction and the second skewing direction based on a result of detection by the belt detecting unit to execute the first control. Thus, it is possible to easily execute the first control.

According to a third aspect of the invention, in the second aspect, the controlling unit obtains information about the first skewing direction based on an average value of amounts of movement of the conveyance belt in the width direction while the first roller and the second roller are caused to rotate in the first rotational direction and the conveyance belt is caused to make one turn, and obtains information about the second skewing direction based on an average value of amounts of movement of the conveyance belt in the width direction while the first roller and the second roller are caused to rotate in the second rotational direction and the conveyance belt is caused make one turn.

According to this aspect, it is possible to easily and appropriately obtain the information about the first skewing direction and the second skewing direction.

According to a fourth aspect of the invention, in the second aspect or the third aspect, the belt detecting unit is provided at least at a position where a distance from the first roller in the moving direction is shorter than a distance from the second roller in the moving direction.

According to this aspect, the belt detecting unit is provided at least at a position closer to the first roller driven. Thus, it is possible to enhance accuracy of the detection by the belt detecting unit of the movement of the conveyance belt in the width direction.

According to a fifth aspect of the invention, in any of the second aspect to the fourth aspect, the belt detecting unit is provided at both a supporting surface-side of the conveyance belt and an opposite surface-side of the conveyance belt located on an opposite side to the supporting surface, across the first roller and the second roller.

In the case of performing the detection by the belt detecting unit of both the case where the first roller is caused to rotate in the first rotational direction and the case where the first roller is caused to rotate in the second rotational direction, a rotational direction of the conveyance belt also changes according to the rotational directions of the first roller, and conditions for detection of the conveyance belt by the belt detecting unit changes.

According to this aspect, the belt detecting unit is provided at both the supporting surface-side of the conveyance belt and the opposite surface-side of the conveyance belt located on an opposite side to the supporting surface across the first roller and the second roller. Thus, when the first roller is caused to rotate in any of the first rotational direction and the second rotational direction, it is possible to use the belt detecting unit provided, for example, on a side where the belt is pulled toward the first roller. Thus, the conditions for detection made by the belt detecting unit can be equalized between the case where the first roller is caused to rotate in the first rotational direction and the case where the first roller is caused to rotate in the second rotational direction, and it is possible to perform detection with high reliability.

According to a sixth aspect of the invention, in any of the first aspect to the fifth aspect, the medium conveying device includes an intersecting-direction shaft-position adjusting portion configured to allow at least one shaft end of four shaft ends, among a shaft end on one side and a shaft end on the other side of the first roller and a shaft end on one side and a shaft end on other side of the second roller, to be displaceable in an intersecting direction intersecting the supporting surface of the conveyance belt, and in the medium conveying device, when the controlling unit determines in the first control that the first skewing direction and the second skewing direction differ from each other, adjustment of a position of a shaft end in the intersecting direction by the intersecting-direction shaft-position adjusting portion is performed.

When the controlling unit determines in the first control that the first skewing direction and the second skewing direction differ from each other, it is possible to determine that there occurs a state including the out-of-plane misalignment in which one shaft end, from among the shaft end on one side and the shaft end on the other side of the first roller and the shaft end on one side and the shaft end on the other side of the second roller, is misaligned from a plane including the other three shaft ends.

According to this aspect, when the controlling unit determines in the first control that the first skewing direction and the second skewing direction differ from each other, adjustment of a position of a shaft end in the intersecting direction by the intersecting-direction shaft-position adjusting portion is performed. Thus, it is possible to reduce the out-of-plane misalignment to enhance a degree of parallelity of the first roller and the second roller.

According to a seventh aspect of the invention, in the sixth aspect, the adjustment of the position of the shaft end in the intersecting direction by the intersecting-direction shaft-position adjusting portion is performed by displacing a position of one shaft end of the four shaft ends in the intersecting direction without changing positions of three shaft ends.

According to this aspect, it is possible to easily perform adjustment to reduce the out-of-plane misalignment.

According to an eighth aspect of the invention, in any of the first aspect to the seventh aspect, the medium conveying device includes a moving-direction shaft-position adjusting portion configured to allow at least one shaft end of four shaft ends, including a shaft end on one side and a shaft end on the other side of the first roller and a shaft end on one side and a shaft end on the other side of the second roller, to be displaceable in the moving direction, and in the medium conveying device, when the controlling unit determines in the first control that the first skewing direction and the second skewing direction are the same, adjustment of a position of a shaft end in the moving direction by the moving-direction shaft-position adjusting portion is performed.

When the controlling unit determines in the first control that the first skewing direction and the second skewing direction are the same, it is possible to determine that four shaft ends, among a shaft end on one side and a shaft end on the other side of the first roller and a shaft end on one side and a shaft end on the other side of the second roller are in a state of in-plane misalignment in which the four shaft ends are on the same plane.

According to this aspect, when the controlling unit determines in the first control that the first skewing direction and the second skewing direction are the same, adjustment of a position of a shaft end in the moving direction by the moving-direction shaft-position adjusting portion is performed. Thus, it is possible to reduce the in-plane misalignment to enhance a degree of parallelity of the first roller and the second roller.

A recording device according to a ninth aspect of the invention includes the medium conveying device according to any of the first aspect to the eighth aspect, and a recording unit configured to record on the medium supported and conveyed on the supporting surface of the conveyance belt.

According to this aspect, in the recording device including the recording unit configured to record on the medium supported and conveyed on the supporting surface of the conveyance belt of the medium conveying device, it is possible to obtain operation and effects similar to those of the first aspect to the seventh aspect.

A method for determining a skewing state of a conveyance belt according to a tenth aspect of the invention provides a method for determining a skewing state of a conveyance belt in a medium conveying device including a first roller configured to be rotatable in a first rotational direction and in a second rotational direction opposite to the first rotational direction, a second roller disposed to be spaced apart from the first roller and configured to be rotatable in the first rotational direction and in the second rotational direction, and a conveyance belt passed around the first roller and the second roller and configured to support and convey a medium on a supporting surface formed between the first roller and the second roller, the method including determining whether a first skewing direction and a second skewing direction are the same, the first skewing direction indicating whether, when the first roller and the second roller are caused to rotate in the first rotational direction, the conveyance belt moves toward one side or the other side in a width direction intersecting a moving direction of the conveyance belt, and the second skewing direction indicating whether, when the first roller and the second roller are caused to rotate in the second rotational direction, the conveyance belt moves toward the one side or the other side in the width direction.

According to this aspect, it is determined whether misalignment from a parallel state between the first roller and the second roller includes the out-of-plane misalignment, and thus, it is possible to determine a skewing state of the conveyance belt. More specifically, in a case where the first roller and the second roller are caused to rotate in the first rotational direction and in the second rotational direction, when the first skewing direction and the second skewing direction are the same, it is possible to determine that the state does not include the out-of-plane misalignment (state including only the in-plane misalignment), and when the first skewing direction and the second skewing direction are different directions, it is possible to determine that the state includes the out-of-plane misalignment.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Exemplary Embodiment

Hereinafter, an inkjet printer 1 (hereinafter, simply referred to as a printer 1) serving as an example of a recording device according to the invention will be described with reference to the drawings.

Note that, in an X-Y-Z coordinate system in each figure, an X direction represents a width direction of a device. In addition, a Y direction represents a moving direction of a conveyance belt 5, and also represents a conveying direction of a medium P. In addition, a Z direction represents a gravity direction, and represents a height direction of the device. In addition, a +Z direction represents an upper side (including an upper portion, an upper surface, and the like) of the device, and a −Z direction side represents a lower side (including a lower portion, a lower surface, and the like) of the device.

Overview of Printer

Figure 1:
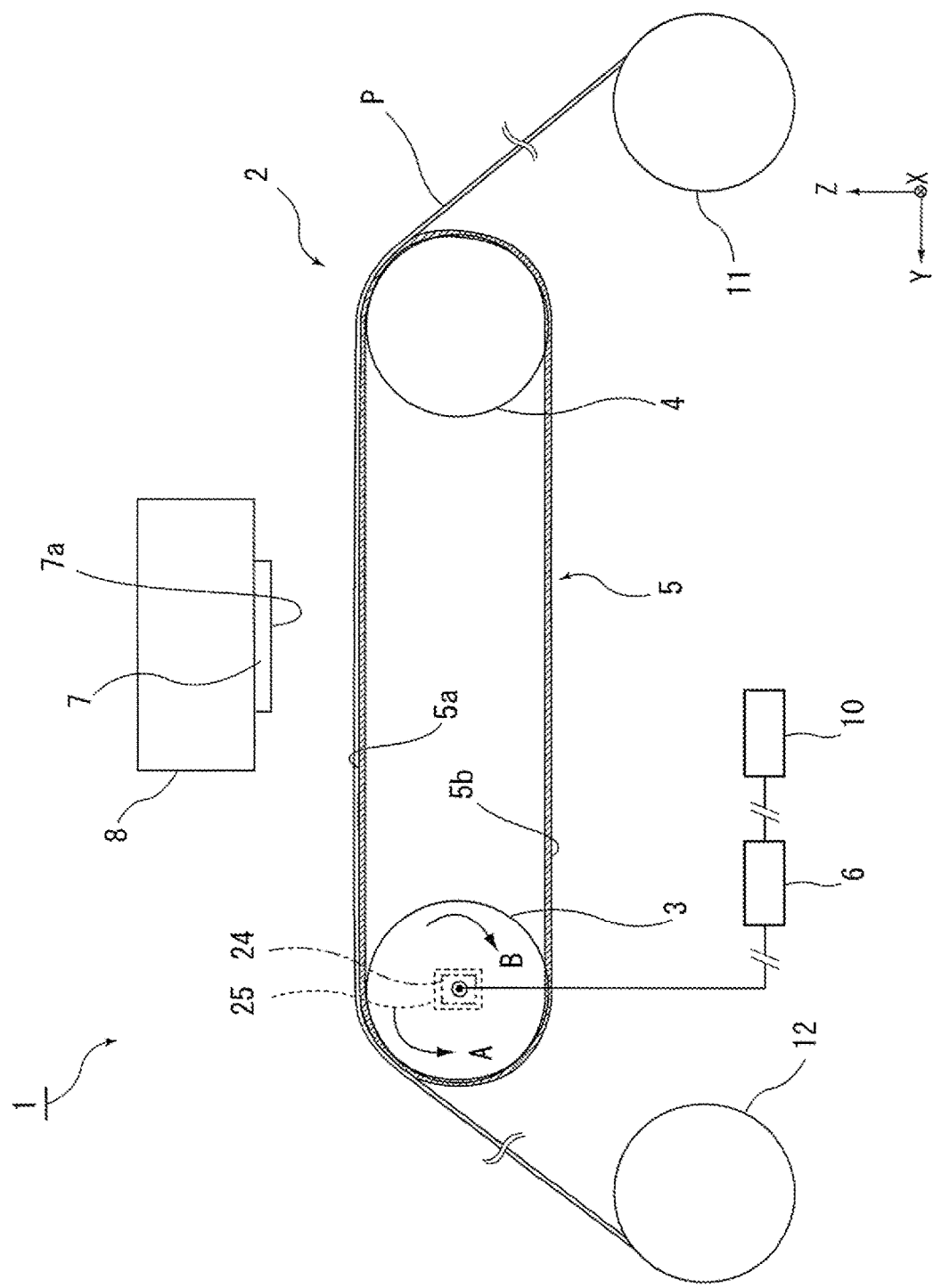
FIG. 1 is a schematic side view illustrating a printer according to the invention.

As an example, the printer 1 according to this exemplary embodiment illustrated in FIG. 1 includes a medium conveying device 2 configured to convey a medium P in a conveying direction (+Y direction) by using the conveyance belt 5. The conveyance belt 5 supports the medium P on a supporting surface 5a on which an adhesive is provided, and the medium conveying device 2 rotates the conveyance belt 5 to convey the medium P. In addition, in the printer 1, a medium P in a roll form can be set, and the printer 1 is provided with a feeding portion 11 capable of feeding the medium P on the conveyance belt 5 of the medium conveying device 2.

The medium P used in the printer 1 includes, for example, fiber such as cotton, silk, wool, chemical fiber, or blend, or a paper medium such as roll paper.

The medium conveying device 2 includes a first roller 3 driven by a drive source 6, a second roller 4 disposed to be spaced apart from the first roller 3, and a conveyance belt 5 passed around the first roller 3 and the second roller 4. In this exemplary embodiment, the second roller 4 is a driven roller configured to rotate in a driven manner in association with rotation of the first roller 3. However, the second roller 4 may be a driving roller driven by a drive source as with the first roller 3.

The conveyance belt 5 is an endless-shaped belt. The conveyance belt 5 can be formed of a material having elasticity such as rubber or a resin, or can also be formed of a metal material.

In addition, the conveyance belt 5 according to this exemplary embodiment includes a configuration in which the medium P is attached to the conveyance belt 5 with an adhesive. However, the configuration of the conveyance belt 5 is not limited to such a configuration. For example, it is also possible to employ a configuration in which the medium P is attached to the conveyance belt 5 by electro-static attraction or suction-absorbing.

As illustrated in FIG. 1, the first roller 3 is configured to be capable of rotating in a first rotational direction A and in a second rotational direction B opposite to the first rotational direction A. The second roller 4 configured to rotate in a driven manner in association with the first roller 3 is configured to be capable of rotating in the first rotational direction A and in the second rotational direction B in association with rotation of the first roller 3.

As the first roller 3 is caused to rotate in the first rotational direction A, the conveyance belt 5 also rotates in the first rotational direction A. At this time, the supporting surface 5a moves in the +Y direction to convey, in the +Y direction, the medium P supported on the supporting surface 5a. The +Y direction is a conveying direction of the medium P at the time of recording on the medium P by using a recording head 7.

Figure 2:
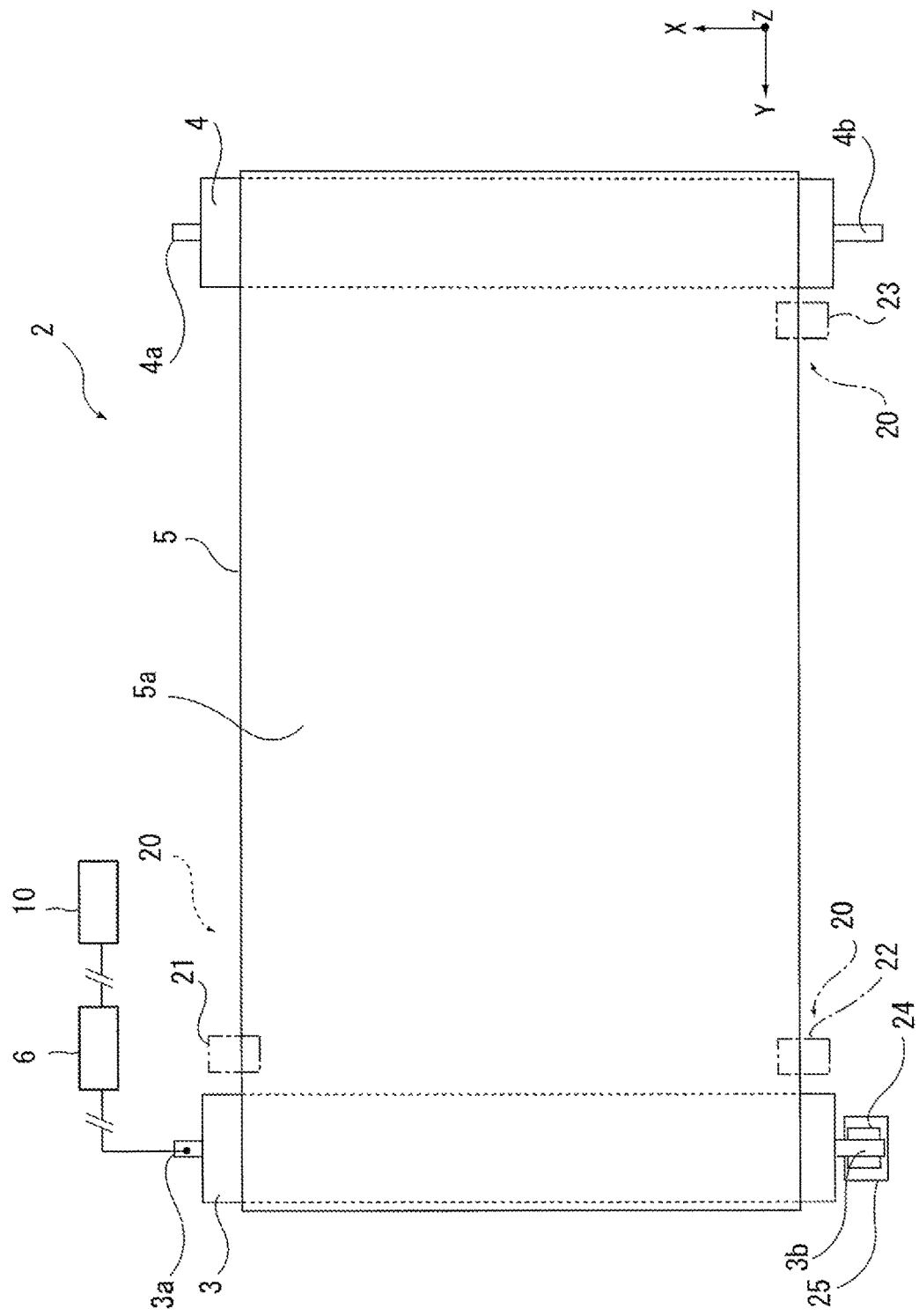
FIG. 2 is a schematic plan view illustrating a medium conveying device according to the invention.

In addition, when the first roller 3 is caused to rotate in the second rotational direction B, the conveyance belt 5 also rotates in the second rotational direction B. At this time, the supporting surface 5a moves in the −Y direction. As illustrated in FIG. 2, the first roller 3 and the second roller 4 each include a rotary shaft, and are configured to rotate about this rotary shaft. Both end portions of the rotary shaft are each referred to as a "shaft end". In FIG. 2, a shaft end on one side of the first roller 3 is denoted by a shaft end 3a, and a shaft end on the other side of the first roller 3 is denoted by a shaft end 3b. In addition, a shaft end on one side of the second roller 4 is denoted by a shaft end 4a, and a shaft end on other side of the second roller 4 is denoted by a shaft end 4b.

In addition, the printer 1 includes the recording head 7 serving as a "recording unit" configured to perform recording on the medium P supported and conveyed on the supporting surface 5a of the conveyance belt 5. The recording head 7 is mounted on a carriage 8 capable of moving back and forth in the width direction (the X axis direction) intersecting the conveying direction (the +Y direction) of the medium P. The recording head 7 discharges ink (liquid) from a liquid discharging surface 7a to record an image and the like on the medium P conveyed below the liquid discharging surface 7a. Note that, as the recording head (recording unit), it is also possible to use a line-head-type head in which a recording head capable of discharging liquid across the width direction (X axis direction) of the medium P is fixed without moving back and forth in the X axis direction to perform recording on the medium P conveyed.

In the case of the printer 1 according to this example, the carriage 8 including the recording head 7 is caused to move back and forth in the X axis direction at the time of recording to perform recording, and the medium conveying device 2 stops conveying the medium P during recording (while the carriage 8 is moving). In other words, during recording, the back and forth movement of the carriage 8 and the conveying of the medium P are performed alternately. Namely, in association with the back and forth movement of the carriage 8, the medium conveying device 2 intermittently conveys the medium P (intermittently moves the conveyance belt 5).

In addition, the medium P subjected to recording by the recording head 7 is configured to be wound in a roll form by a winding portion 12 provided on a downstream side in the conveying direction of the first roller 3.

In the printer 1, operations relating to recording are controlled by a controlling unit 10. The controlling unit 10 controls rotary drive of the first roller 3 to control conveyance of the medium P by the medium conveying device 2, and also controls, for example, discharging of ink from the recording head 7 and movement of the carriage 8.

In addition, as illustrated in FIG. 2, the medium conveying device 2 is provided with a belt detecting unit 20 configured to detect movement in the width direction (the X axis direction) of the conveyance belt 5.

For example, when the first roller 3 and the second roller 4 rotate in a state where the first roller 3 and the second roller 4 are not in parallel, skewing in which the conveyance belt 5 diagonally moves toward any of one side (+X side) and the other side (−X side) in the width direction may occur.

Note that the conveyance belt 5 may move while the conveyance belt 5 is meandering between the +X side and the −X side, and herein, skewing of the conveyance belt 5 refers to a state where the belt is finally positioned on either the +X side or the −X side.

The belt detecting unit 20 can detect whether a skewing direction of the conveyance belt 5 is a direction toward the +X side or the −X side.

In this exemplary embodiment, the belt detecting unit 20 includes a first detecting portion 21 and a second detecting portion 22 provided at positions closer to the first roller 3 in the Y axis direction serving as the moving direction of the conveyance belt 5, and a third detecting portion 23 provided at a position closer to the second roller 4. Specifically, the first detecting portion 21 and the second detecting portion 22 are provided at positions where a distance from the first roller 3 in the Y axis direction is shorter than a distance from the second roller 4. In addition, the third detecting portion 23 is provided at a position where a distance from the second roller 4 in the Y axis direction is shorter than a distance from the first roller 3.

In addition, as illustrated in FIG. 2, the first detecting portion 21 is provided at a position facing an end portion on the +X side in the width direction of the conveyance belt 5, and the second detecting portion 22 and the third detecting portion 23 are provided at positions facing an end portion on the −X side in the width direction of the conveyance belt 5.

The first detecting portion 21, the second detecting portion 22, and the third detecting portion 23 are each formed, for example, as a photointerrupter. That is, the photointerrupter includes a light emitting portion (not illustrated) and a light receiving portion (not illustrated) facing each other with the conveyance belt 5 being sandwiched between the light emitting portion and the light receiving portion. When the conveyance belt 5 is disposed between the light emitting portion and the light receiving portion, the conveyance belt 5 blocks light emitted from the light emitting portion toward the light receiving portion, and the light receiving portion does not receive the light emitted from the light emitting portion. This state indicates a detected state where the conveyance belt 5 is detected by the photointerrupter. On the other hand, when the light receiving portion receives light emitted from the light emitting portion, this indicates a non-detected state where the conveyance belt 5 is not detected by the photointerrupter. In this state, it is possible to determine that the conveyance belt 5 has moved in the width direction from a position where the conveyance belt 5 blocks the light emitted from the light emitting portion toward the light receiving portion.

Figure 3:
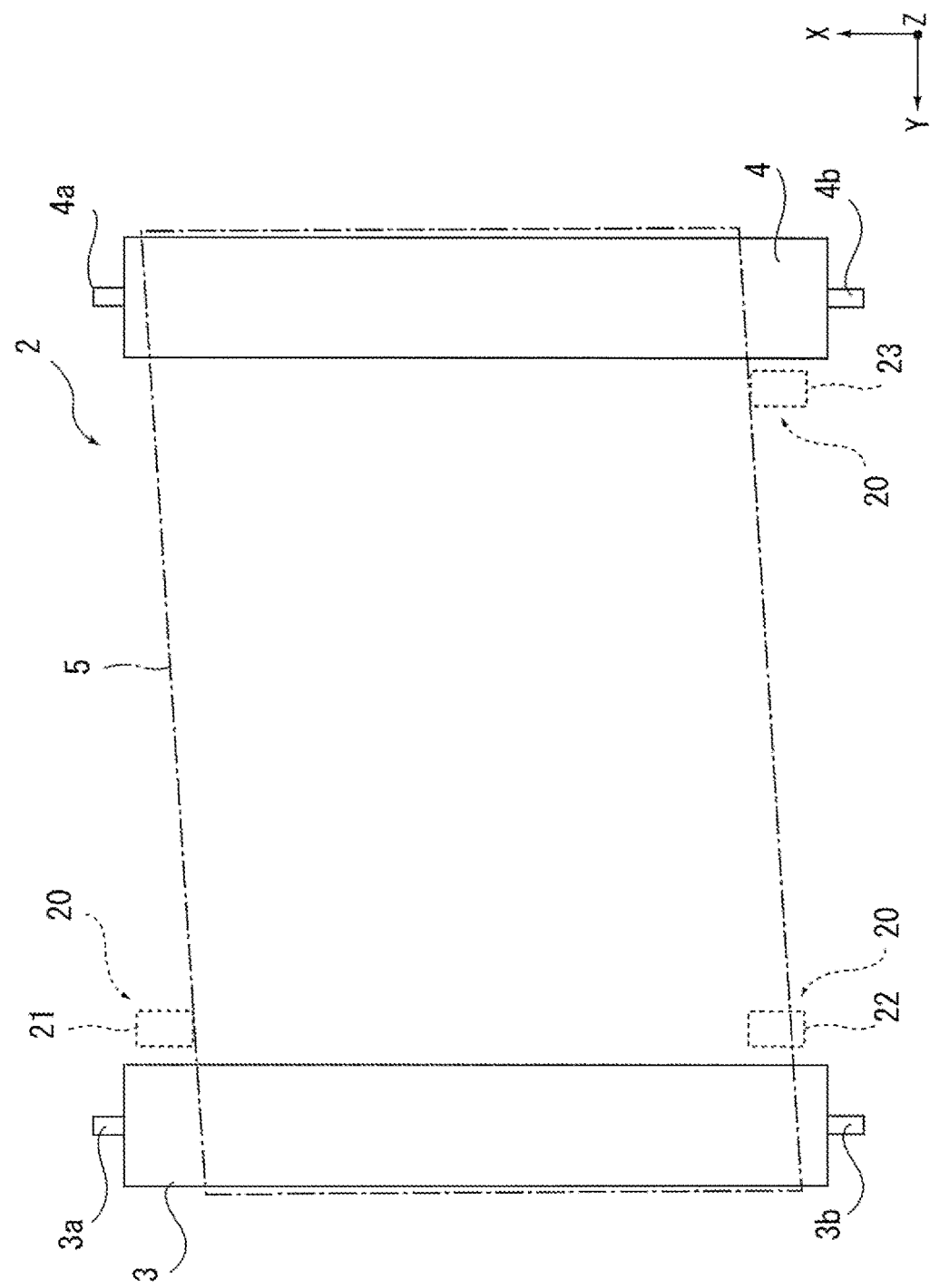
FIG. 3 is a schematic plan view for explaining detection of skewing of a conveyance belt by a belt detecting unit.

For example, when the first roller 3 and the second roller 4 are caused to rotate in the first rotational direction A illustrated in FIG. 1 and the conveyance belt 5 is caused to rotate to move the supporting surface 5a in the +Y direction, it can be said that the conveyance belt 5 skews to move toward the −X side when a state where all the detecting portions of the first detecting portion 21, the second detecting portion 22, and the third detecting portion 23 indicate the detected state as with the conveyance belt 5 illustrated in FIG. 2 as a solid line becomes a state where the second detecting portion 22 indicates the detected state and the first detecting portion 21 and the third detecting portion 23 indicate the non-detected state as with the conveyance belt 5 illustrated in FIG. 3 as a dotted line.

Note that the belt detecting unit 20 can also be configured to include only the first detecting portion 21 and the second detecting portion 22 provided at positions closer to the first roller 3, but the belt detecting unit 20 can be configured to include the third detecting portion 23 provided at a position closer to the second roller 4, and hence, can be configured to be capable of more reliably detecting the movement in the width direction of the conveyance belt 5.

In addition, in addition to the case where the belt detecting unit 20 includes the photointerrupter, the belt detecting unit 20 can also use, for example, various types of known sensors such as an optical (red LED) sensor, a laser-type sensor, a ball-type sensor, a blue-LED sensor, or an infrared (IR) sensor based on the same principle as or similar to the principle of a sensor used in a computer mouse and capable of detecting two-dimensional (plane) movement. In the case of using such a sensor, it is possible to employ, for example, a configuration in which a sensor is provided at only one position of the first detecting portion 21.

In particular, when the conveyance belt 5 is formed of a material having elasticity, the belt detecting unit 20 is preferably provided at a position closer to the first roller 3 serving as a driving roller. The belt detecting unit 20 is provided at the position closer to the first roller 3, and hence, it is possible to reduce influence of expansion and contraction of the conveyance belt 5, and detect the movement in the width direction of the conveyance belt 5 in a more reliable and highly precise manner.

Here, the skewing of the conveyance belt 5 occurs owing to, as one of factors, misalignment from the parallel state of the first roller 3 and the second roller 4 around which the conveyance belt 5 is passed as described above.

Figure 4:
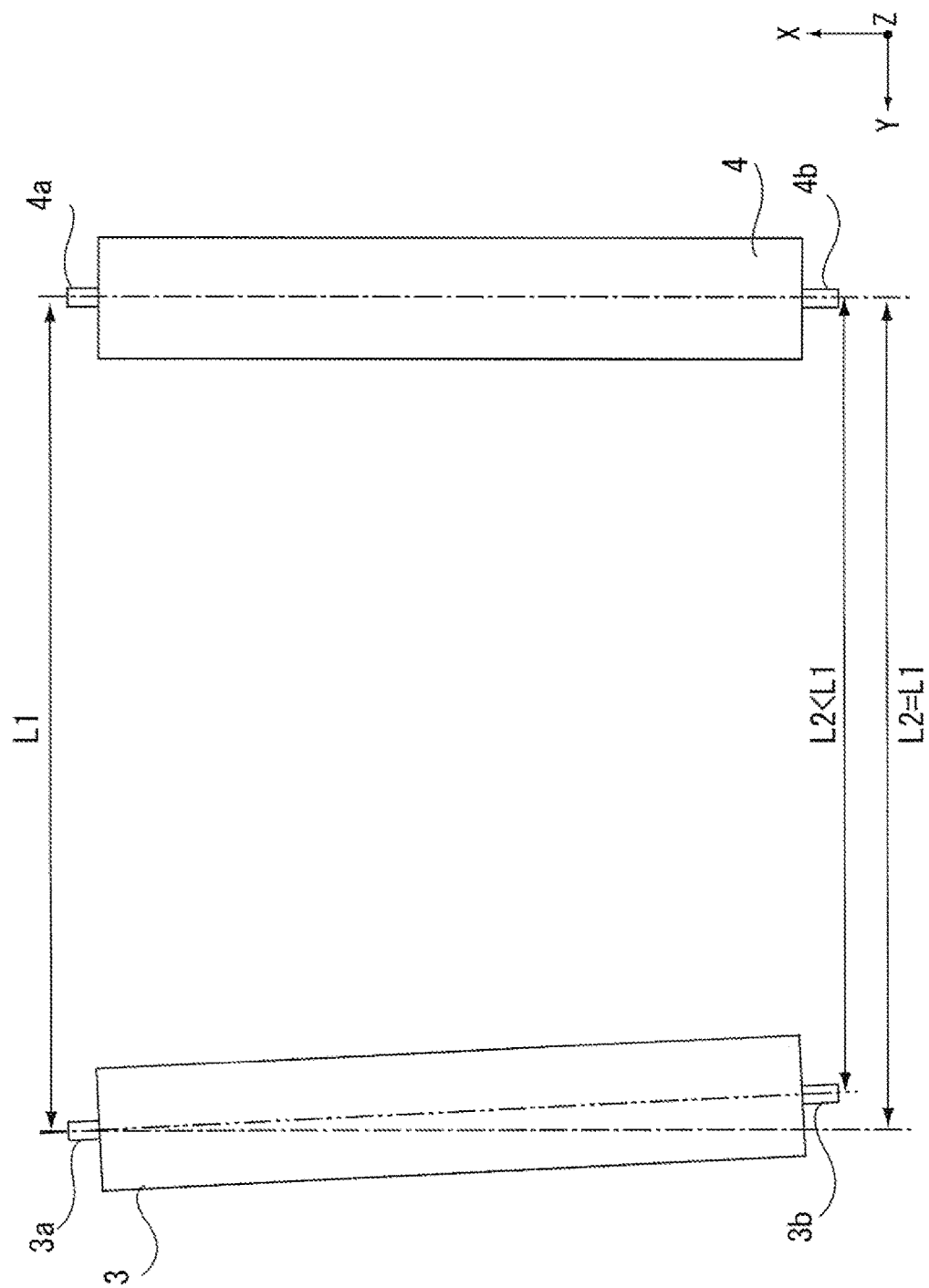
FIG. 4 is a schematic plan view for explaining skewing of a conveyance belt.
Figure 5:
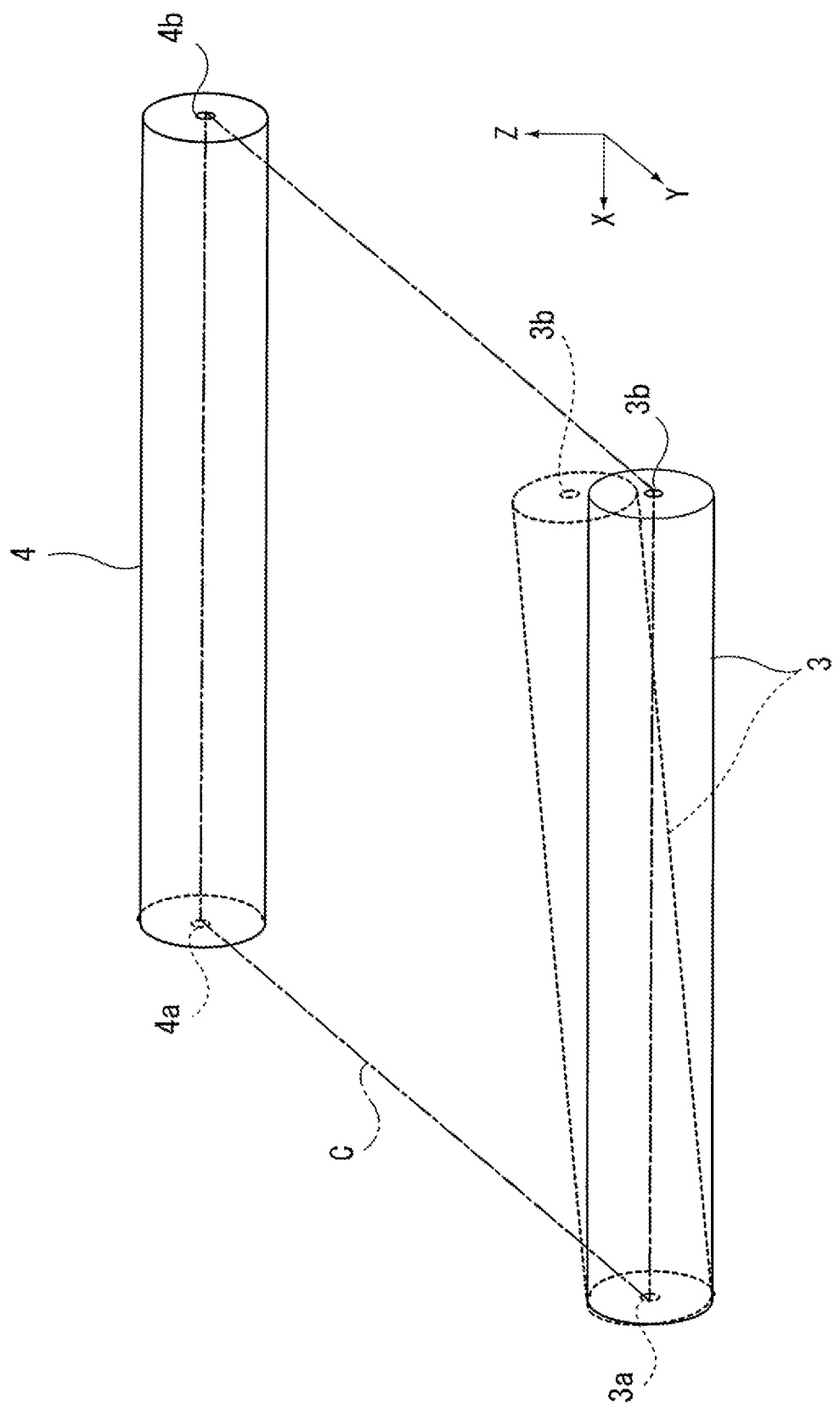
FIG. 5 is a schematic perspective view for explaining skewing of a conveyance belt.

The misalignment from the parallel state of the first roller 3 and the second roller 4 includes misalignment of a state illustrated in FIG. 4 and misalignment of a state illustrated in FIG. 5. The misalignment will be specifically described hereinafter.

FIG. 4 illustrates a state where all of the four shaft ends 3a, 3b, 4a, and 4b including the shaft end 3a on one side and the shaft end 3b on other side of the first roller 3 and the shaft end 4a on one side and the shaft end 4b on the other side of the second roller 4 are on the same plane (on the paper surface of FIG. 4), and one shaft end (the shaft end 3b of the first roller 3 in FIG. 4) is misaligned in the Y axis direction. Specifically, in FIG. 4, the shaft end 3b is misaligned to be closer to the shaft end 4b. Assuming that a distance between the shaft end 3a and the shaft end 4a is a distance L1, and a distance between the shaft end 3b and the shaft end 4b is a distance L2, when the first roller 3 and the second roller 4 are in parallel to each other, a relationship between the distance L1 and the distance L2 holds as L2=L1. However, the distance L1 and the distance L2 are in a state of L2<L1 in FIG. 4. Accordingly, misalignment causing a difference between L1 and L2 due to misalignment in the Y axis direction of any of the shaft ends is referred to as "in-plane misalignment".

FIG. 5 illustrates a state where one shaft end (the shaft end 3b of the first roller 3 illustrated as a dotted line in FIG. 5) of the four shaft ends 3a, 3b, 4a, and 4b is not on the same plane C. In other words, in the state illustrated in FIG. 5, the first roller 3 and the second roller 4 are in a state where the first roller 3 and the second roller 4 have a twist-position relationship. Accordingly, misalignment in which the four shaft ends 3a, 3b, 4a, and 4b are not arranged on the same plane C owing to misalignment in the Z axis direction of any of the shaft ends is referred to as "out-of-plane misalignment".

In summary, in this exemplary embodiment, the state where the first roller 3 and the second roller 4 are misaligned from the parallel state as illustrated in FIG. 4 is referred to as the "in-plane misalignment", and the state where the first roller 3 and the second roller 4 are misaligned from the parallel state as illustrated in FIG. 5 is referred to as the "out-of-plane misalignment".

Note that both the "in-plane misalignment" and the "out-of-plane misalignment" may occur in a combined manner.

In the case of correcting the skewing of the conveyance belt 5 being in the state illustrated in FIG. 4, the misaligned shaft end 3b needs to move in the Y axis direction. On the other hand, in the case of correcting the skewing of the conveyance belt 5 in the state illustrated in FIG. 5, the misaligned shaft end 3b—needs to move in the Z axis direction. Namely, a countermeasure method varies depending on causes of skewing. Thus, when the medium P skews, a cause of the skewing needs to be appropriately identified to appropriately correct the skewing. In this exemplary embodiment, the controlling unit 10 executes "first control" described below, and hence, it is possible to determine whether a main cause of misalignment from the parallel state of the first roller 3 and the second roller 4 is the "in-plane misalignment" or the "out-of-plane misalignment".

About First Control

The first control that the controlling unit 10 can execute is control to determine whether a first skewing direction T1 and a second skewing direction T2 are the same, assuming that the first skewing direction indicates whether, when the first roller 3 and the second roller 4 are caused to rotate in the first rotational direction A in FIG. 1, the conveyance belt 5 moves toward one side (+X side) or the other side (−X side) in the width direction (X axis direction) intersecting the moving direction (+Y direction) of the conveyance belt 5, and the second skewing direction indicates whether, when the first roller 3 and the second roller 4 are caused to rotate in the second rotational direction B (the case where the conveyance belt 5 moves in the −Y direction), the conveyance belt 5 moves toward the one side or the other side in the width direction.

This first control is performed, and hence, it is possible to detect whether misalignment from a parallel state between the first roller 3 and the second roller 4 includes the out-of-plane misalignment.

Hereinafter, a description will specifically be made of a method for determining a skewing state of the conveyance belt 5, in which it is determined in the first control whether the out-of-plane misalignment exists.

In this exemplary embodiment, the method for determining a skewing state of the conveyance belt 5 is based on the fact that skewing of the conveyance belt 5 behaves differently between the case where no out-of-plane misalignment exists and only the in-plane misalignment exists and the case where the out-of-plane misalignment exists.

Figure 6:
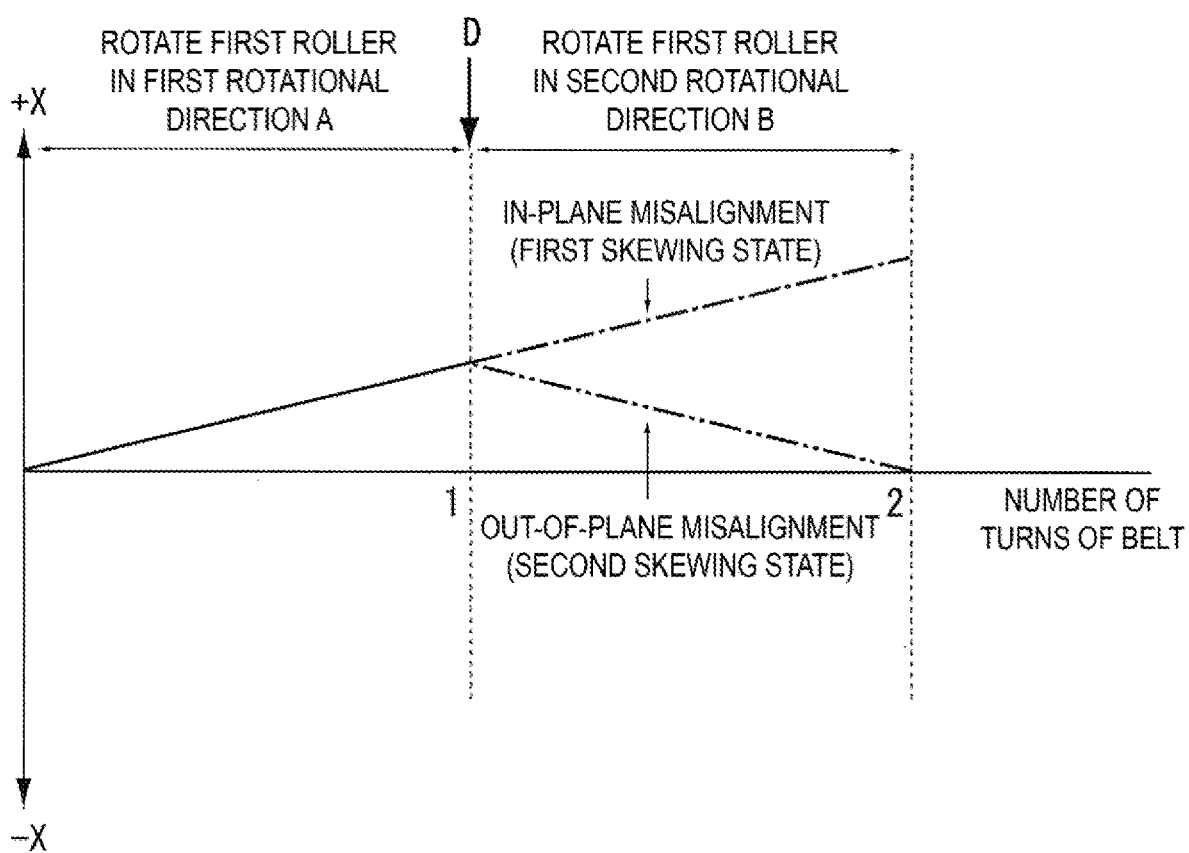
FIG. 6 is a view for explaining a method for determining a skewing state of a conveyance belt.

FIG. 6 is a view (graph) for explaining a method for determining a skewing state of the conveyance belt 5. A vertical axis of the graph indicates a skewing direction of the conveyance belt 5 detected by the belt detecting unit 20 (whether the conveyance belt 5 skews toward the +X direction or the −X direction). A horizontal axis of the graph indicates the number of turns of the conveyance belt 5 (belt turning number). Note that "D" in FIG. 6 represents a point of switching of rotational directions of the first roller 3 and the second roller 4.

First, the controlling unit 10 rotates the first roller 3 and the second roller 4 in the first rotational direction A. At this time, in the example illustrated in FIG. 6, skewing of the conveyance belt 5 toward the +X direction occurs. Therefore, in FIG. 6, the first skewing direction T1 becomes the +X direction.

Once the conveyance belt 5 is caused to make one turn in the first rotational direction A and reaches the point of switching D, the first roller 3 and the second roller 4 are caused to rotate in the opposite direction, that is, the first roller 3 and the second roller 4 are caused to rotate in the second rotational direction B.

At this time, when misalignment from a parallel state between the first roller 3 and the second roller 4 only includes the in-plane misalignment (FIG. 4), even when the rotational directions of the first roller 3 and the second roller 4 are switched to the second rotational direction B, the skewing direction (the second skewing direction T2) remains unchanged. That is, the conveyance belt 5 continues to move toward the +X direction after the point of switching D, as a graph indicated by a long dashed short dashed line in FIG. 6. Namely, the second skewing direction T2 is also the +X direction, and the first skewing direction T1 and the second skewing direction T2 are the same.

On the other hand, when misalignment from a parallel state between the first roller 3 and the second roller 4 includes the out-of-plane misalignment (FIG. 5), when the rotational directions of the first roller 3 and the second roller 4 are switched to the second rotational direction B, the skewing direction (the second skewing direction T2) becomes the −X direction opposite to the first skewing direction T1. That is, the conveyance belt 5 moves toward the −X direction after the point of switching D, as a graph indicated by a long dashed double-short dashed line in FIG. 6. Namely, the second skewing direction T2 becomes the −X direction, and the first skewing direction T1 and the second skewing direction T2 become different directions. Note that, similarly, when both the in-plane misalignment and the out-of-plane misalignment occur, the conveyance belt 5 moves as the graph indicated by the long dashed double-short dashed line in FIG. 6.

Therefore, it is possible to determine whether misalignment from a parallel state between the first roller 3 and the second roller 4 includes the out-of-plane misalignment, based on a change of the moving direction of the conveyance belt 5 at the time of switching the rotational directions of the first roller 3 and the second roller 4.

Further specifically, the method for determining a skewing state of the conveyance belt 5 according to this exemplary embodiment includes determining that the conveyance belt 5 is in a state of the "in-plane misalignment" where as illustrated in FIG. 4, the conveyance belt 5 skews in a state where the four shaft ends 3a, 3b, 4a, and 4b including the shaft end 3a on one side and the shaft end 3b on the other side of the first roller 3 and the shaft end 4a on one side and the shaft end 4b on the other side of the second roller 4 are on the same plane, when the first skewing direction T1 and the second skewing direction T2 are the same (when the belt behaves as the graph indicated by the long dashed short dashed line in FIG. 6), with the first skewing direction T1 indicating whether, when the first roller 3 and the second roller 4 are caused to rotate in the first rotational direction A, the conveyance belt 5 moves toward one side or the other side in the width direction, and the second skewing direction T2 indicating whether, when the first roller 3 and the second roller 4 are caused to rotate in the second rotational direction B, the conveyance belt 5 moves toward the one side or the other side in the width direction. This is because when the first skewing direction T1 and the second skewing direction T2 are the same, it can be said that the out-of-plane misalignment is not occurring, and thus, when skewing of the medium P is occurring in this state, it is possible to determine that the in-plane misalignment is a cause of the skewing.

In addition, in the method for determining a skewing state of the conveyance belt 5 according to this exemplary embodiment, when the first skewing direction T1 and the second skewing direction T2 are different directions (when the belt behaves as the graph indicated by the long dashed double-short dashed line in FIG. 6), it is determined that the belt is in a state including the "out-of-plane misalignment" in which the conveyance belt 5 skews in a state where the one shaft end 3b of the four shaft ends 3a, 3b, 4a, and 4b including the shaft end 3a and the shaft end 3b of the first roller 3 and the shaft end 4a and the shaft end 4b of the second roller 4 is not located on the same plane C as the other three shaft ends 3a, 4a, and 4b. Note that, as described above, in this case, the "in-plane misalignment" may occur at the same time.

Hence, it is possible to determine whether misalignment from a parallel state between the first roller 3 and the second roller 4 is in a state of the "in-plane misalignment" or in a state including the "out-of-plane misalignment".

In this exemplary embodiment, the controlling unit 10 obtains information about the first skewing direction T1 and the second skewing direction T1 based on a result of detection by the belt detecting unit 20 to execute the first control. Hence, it is possible to easily and automatically execute the first control.

Note that, it is also possible to employ a configuration in which when the rotational directions of the first roller 3 and the second roller 4 are switched between the first rotational direction A and the second rotational direction B, the first skewing direction T1 indicating the skewing direction of the conveyance belt 5 at the time of rotating in the first rotational direction A and the second skewing direction T2 indicating the skewing direction of the conveyance belt 5 at the time of rotating in the second rotational direction B are visually confirmed, information about the first rotational direction A and the second rotational direction B is sent to the controlling unit 10 through an input unit (not illustrated), and the controlling unit executes the first control.

In addition, the controlling unit 10 may be configured to obtain information about the first skewing direction T1 based on an average value of an amount of movement in the width direction of the conveyance belt 5 during a time when the first roller 3 and the second roller 4 are caused to rotate in the first rotational direction A and the conveyance belt 5 makes one turn, and to obtain information about the second skewing direction T2 based on an average value of an amount of movement in the width direction of the conveyance belt 5 during a time when the first roller 3 and the second roller 4 are caused to rotate in the second rotational direction B and the conveyance belt 5 makes one turn. This is because it is only necessary that the information about the first skewing direction T1 and the second skewing direction T2 includes information about a "direction of skewing" as to whether the skewing direction is the +X direction or the −X direction, and it is not necessary to correctly identify a degree of skewing. It is possible to easily and appropriately obtain the information about the first skewing direction T1 and the second skewing direction T2 based on the average value of the amount of movement in the width direction of the conveyance belt 5 during a time when the conveyance belt 5 makes one turn in each direction.

Figure 7:
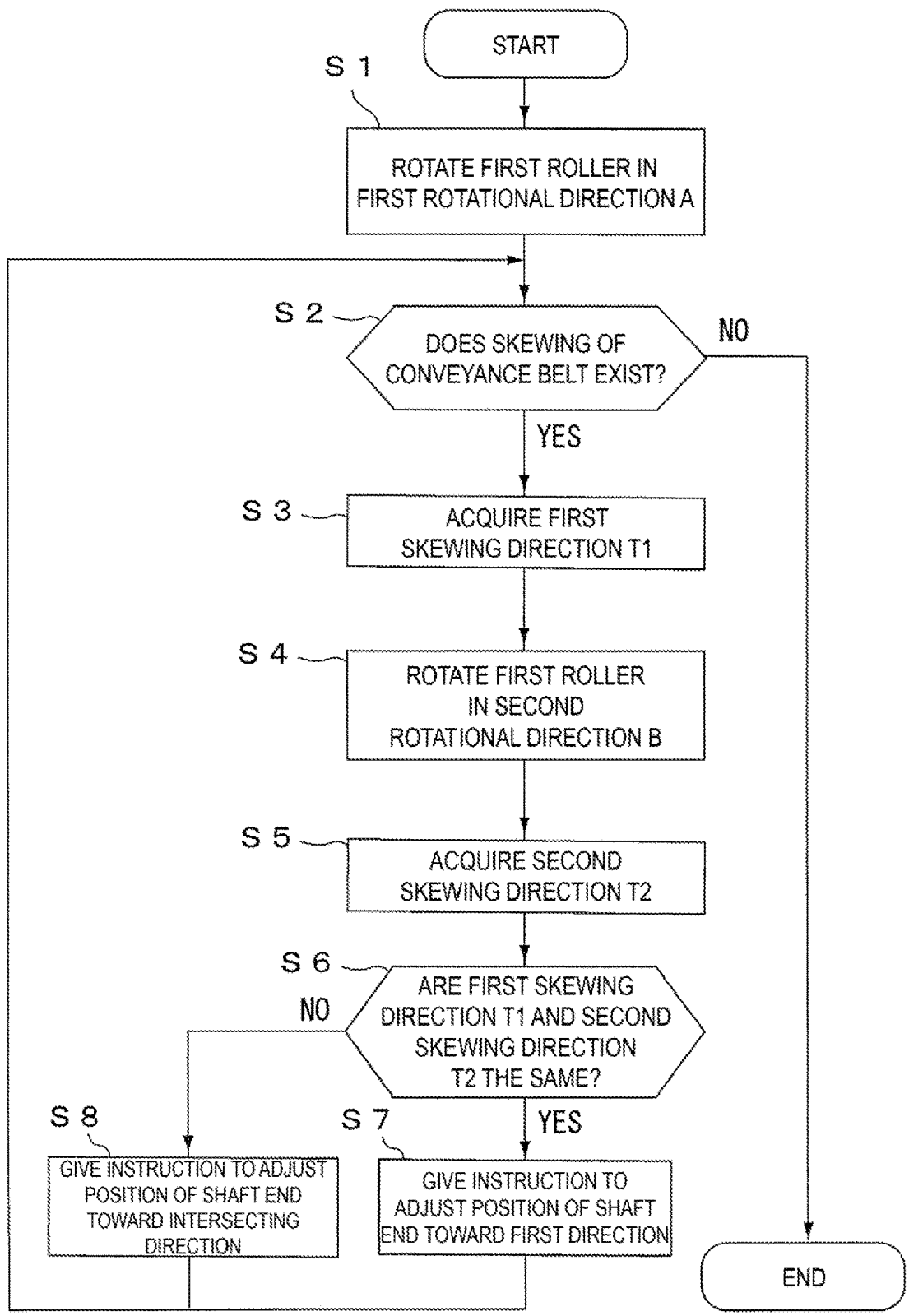
FIG. 7 is a flow chart illustrating a flow of first control executed by a controlling unit.

The first control that the controlling unit 10 performs will be described with reference to a flow chart illustrated in FIG. 7.

First, at step S1, the controlling unit 10 causes the first roller 3 to perform rotary drive in the first rotational direction A. The second roller 4 follows the rotation of the first roller 3, and also rotates in the first rotational direction A.

Subsequently, at step S2, it is determined whether skewing of the conveyance belt 5 exists, based on the result of detection by the belt detecting unit 20. When the skewing of the conveyance belt 5 exists, that is, when the result is YES at step S2, the flow advances to step S3 to acquire the first skewing direction T1 indicating the skewing direction of the conveyance belt 5 in a case where the first roller 3 is caused to rotate in the first rotational direction A. The first skewing direction T1 is calculated based on the result of detection by the belt detecting unit 20.

When no skewing of the conveyance belt 5 exists, that is, when the result is NO at step S2, the first control ends.

After the first skewing direction T1 is obtained at step S3, the flow advances to step S4 to cause the first roller 3 to perform rotary drive in the second rotational direction B, and at step S5, the second skewing direction T2 indicating the skewing direction of the conveyance belt 5 at this time is acquired. The second skewing direction T2 is calculated based on the result of detection by the belt detecting unit 20.

Next, the flow advances to step S6, and it is determined whether the first skewing direction T1 acquired and the second skewing direction T2 acquired are the same. When the first skewing direction T1 and the second skewing direction T2 are the same, that is, when the result is YES at step S6, it is determined that skewing of the conveyance belt 5 is only due to the in-plane misalignment, and at step S7, an instruction is given to adjust, toward the Y axis direction (the moving direction of the conveyance belt 5), a position of at least one shaft end of the four shaft ends 3a, 3b, 4a, and 4b including the shaft end 3a and the shaft end 3b of the first roller 3 and the shaft end 4a and the shaft end 4b of the second roller 4. For example, the controlling unit 10 issues an alert to prompt adjustment toward the conveying direction of the position of at least one shaft end of the four shaft ends 3a, 3b, 4a, and 4b.

In addition, when the first skewing direction T1 and the second skewing direction T2 are different, that is, when the result is NO at step S6, it is determined that a cause of the skewing of the conveyance belt 5 includes the out-of-plane misalignment.

At step S8, an instruction is given to adjust, toward the "intersecting direction" (the Z axis direction in this exemplary embodiment), the position of at least one shaft end of the four shaft ends 3a, 3b, 4a, and 4b including the shaft end 3a and the shaft end 3b of the first roller 3 and the shaft end 4a and the shaft end 4b of the second roller 4.

At step S7 or step S8, an instruction is given to adjust the position of the shaft end. After this adjustment is performed, the flow returns to step S2, and step S2 to step S8 are repeated until the result is NO at step S2, that is, until it is determined that no skewing of the conveyance belt 5 exists.

The first control is summarized below. When the conveyance belt 5 skews, the existence or absence of the out-of-plane misalignment is first confirmed. When the out-of-plane misalignment exists, elimination of the out-of-plane misalignment is attempted. Then, when the conveyance belt 5 skews even after the out-of-plane misalignment is eliminated, it is determined that the in-plane misalignment remains, and elimination of the in-plane misalignment is attempted. The reason that such a flow is employed is that the out-of-plane misalignment has greater influence on skewing of the medium P than the in-plane misalignment has, and needs to be preferentially eliminated.

Note that, at step S7 and step S8, in addition to the case of issuing an alert to prompt adjustment toward each direction, the controlling unit 10 can also be configured to control operations of an intersecting-direction shaft-position adjusting portion 24 or a moving-direction shaft-position adjusting portion 25, each of which will be described later, to automatically adjust a position of a shaft end.

Preferably, the first control is executed when there is a change in environment such as a change of a state where the first roller 3 and the second roller 4 are attached. For example, it is preferable to perform the first control, for example, after the printer 1 is assembled, after a change of a location where the printer 1 is installed, and when deformation of a shape of an installation surface for the printer 1 occurs. Note that the controlling unit 10 may be configured to, when there is a change in environment such as a change of a state where the first roller 3 and the second roller 4 are attached, detect such a change in environment, and issue an alert to prompt execution of the first control. For example, a posture sensor configured to detect a posture of the printer 1 is provided, and thus, it is possible to detect a change in environment such as a change of a state where the first roller 3 and the second roller 4 are attached.

In addition, the controlling unit 10 can also execute the first control by using an external device such as a computer connected to the printer 1.

About Intersecting-Direction Shaft-Position Adjusting Portion and Moving-Direction Shaft-Position Adjusting Portion.

To correct misalignment from a parallel state between the first roller 3 and the second roller 4, the medium conveying device 2 is provided with an intersecting-direction shaft-position adjusting portion 24 and a moving-direction shaft-position adjusting portion 25 as illustrated in FIG. 1. The intersecting-direction shaft-position adjusting portion 24 enables at least one shaft end (the shaft end 3b in this exemplary embodiment) of the four shaft ends 3a, 3b, 4a, and 4b including the shaft end 3a and the shaft end 3b of the first roller 3 and the shaft end 4a and the shaft end 4b of the second roller 4 to displace in an intersecting direction (the Z direction in this exemplary embodiment) intersecting the supporting surface 5a of the conveyance belt 5.

The moving-direction shaft-position adjusting portion 25 enables at least one shaft end (the shaft end 3b in this exemplary embodiment) of the four shaft ends 3a, 3b, 4a, and 4b including the shaft end 3a and the shaft end 3b of the first roller 3 and the shaft end 4a and the shaft end 4b of the second roller 4 to displace in the Y axis direction (the moving direction of the conveyance belt 5).

Figure 8:
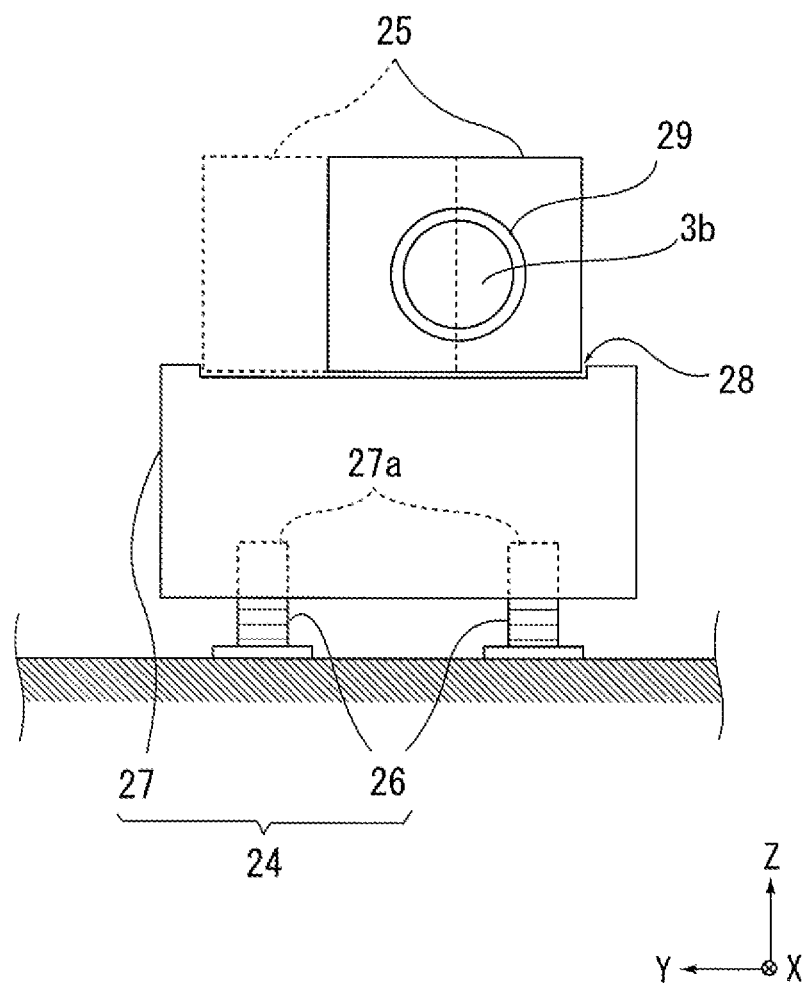
FIG. 8 is a schematic side view illustrating an example of an intersecting-direction shaft-position adjusting portion and a moving-direction shaft-position adjusting portion.

FIG. 8 illustrates an example of the intersecting-direction shaft-position adjusting portion 24 and the moving-direction shaft-position adjusting portion 25.

The intersecting-direction shaft-position adjusting portion 24 includes a base portion 27, and a screw portion 26 configured to screw into a screw hole 27a provided on a bottom portion of the base portion 27, and the intersecting-direction shaft-position adjusting portion 24 is configured to rotate the screw portion 26, and hence, displace the base portion 27 in the Z axis direction.

In addition, the moving-direction shaft-position adjusting portion 25 includes a bearing 29 to which the shaft end 3b is attached. The moving-direction shaft-position adjusting portion 25 is disposed on an upper portion of the base portion 27 of the intersecting-direction shaft-position adjusting portion 24, and is configured to be capable of displacing in the Y axis direction along a slide groove 28 provided on an upper surface of the base portion 27.

The intersecting-direction shaft-position adjusting portion 24 and the moving-direction shaft-position adjusting portion 25 enable manual displacement in each direction.

When the controlling unit 10 determines in the first control that the first skewing direction T1 and the second skewing direction T2 are different, adjustment of a position of a shaft end in the Z axis direction by the intersecting-direction shaft-position adjusting portion 24 is performed. Hence, it is possible to reduce the out-of-plane misalignment, and enhance a degree of parallelity of the first roller 3 and the second roller 4.

Note that, when the intersecting-direction shaft-position adjusting portion 24 is manually operated as in this exemplary embodiment, it is possible to employ, for example, a configuration in which an alert to prompt adjustment by the intersecting-direction shaft-position adjusting portion 24 is displayed on a display unit (not illustrated), and hence, the adjustment of a position of an shaft end is performed. The alert may be indicated by lighting with a lamp or the like.

In addition, when the controlling unit 10 determines in the first control that the first skewing direction T1 and the second skewing direction T2 are the same, adjustment of a position of a shaft end in the Y axis direction by the moving-direction shaft-position adjusting portion 25 is performed. Hence, it is possible to reduce the in-plane misalignment, and enhance a degree of parallelity of the first roller 3 and the second roller 4.

As with the intersecting-direction shaft-position adjusting portion 24, when the moving-direction shaft-position adjusting portion 25 is manually operated, it is possible to employ, for example, a configuration in which an alert to prompt adjustment by the intersecting-direction shaft-position adjusting portion 24 is displayed on a display unit, or is issued by lighting with an alert lamp, and the adjustment of a position of a shaft end is performed.

The intersecting-direction shaft-position adjusting portion 24 and the moving-direction shaft-position adjusting portion 25 can also be configured to receive power from a power source (not illustrated) to displace in each direction, and can also be configured such that the controlling unit 10 automatically controls displacement of the intersecting-direction shaft-position adjusting portion 24 and the moving-direction shaft-position adjusting portion 25.

The controlling unit 10 systematically performs control from the first control to the adjustment in the Z axis direction or in the Y axis direction of a position of a shaft end, and hence, it is possible to easily adjust a degree of parallelity of the first roller 3 and the second roller 4.

In this exemplary embodiment, the intersecting-direction shaft-position adjusting portion 24 and the moving-direction shaft-position adjusting portion 25 are provided only on one shaft end 3b of the four shaft ends 3a, 3b, 4a, and 4b of the first roller 3 and the second roller 4.

That is, the adjustment of a position of a shaft end in the Z axis direction by the intersecting-direction shaft-position adjusting portion 24 and the adjustment of a position of a shaft end in the Y axis direction by the moving-direction shaft-position adjusting portion 25 are performed by displacing a position of the one shaft end 3b in the Z axis direction or in the Y axis direction without changing positions of the other three shaft ends 3a, 4a, and 4b of the four shaft ends 3a, 3b, 4a, and 4b. Hence, it is possible to easily perform adjustment to reduce the out-of-plane misalignment or the in-plane misalignment.

Figure 9A:
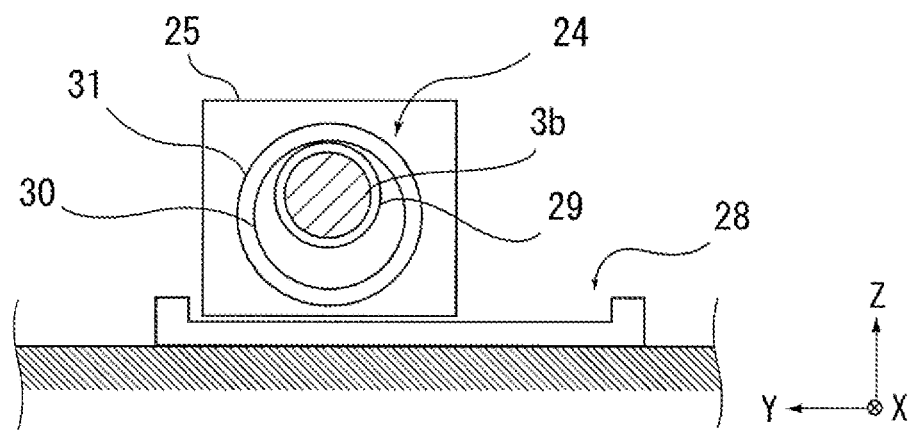
FIG. 9A is a schematic side view illustrating another example of an intersecting-direction shaft-position adjusting portion and a moving-direction shaft-position adjusting portion and illustrating a state where a shaft end in a −X direction of a first roller is located at an uppermost position in a +Z direction.
Figure 9B:
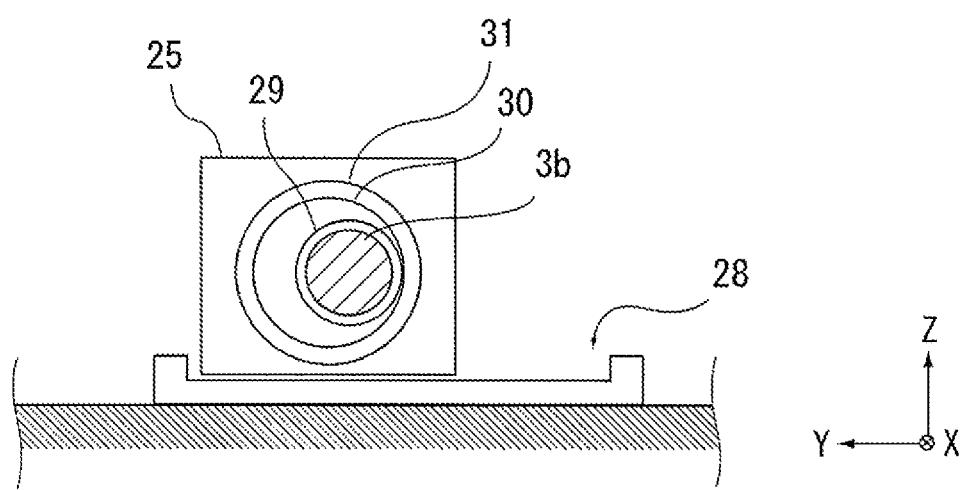
FIG. 9B is a schematic side view illustrating another example of an intersecting-direction shaft-position adjusting portion and a moving-direction shaft-position adjusting portion and illustrating a state where a position in a Z axis direction of a shaft end in the −X direction of the first roller is located at the center in the range where the shaft end moves.
Figure 9C:
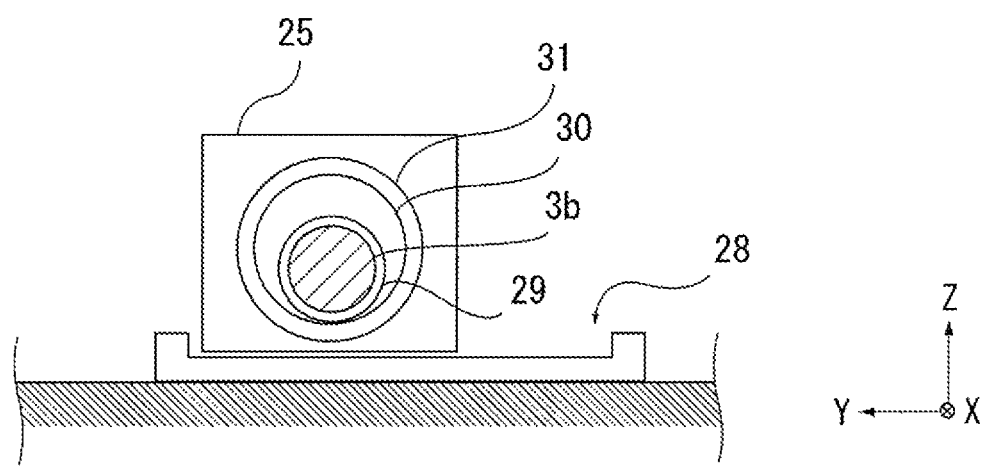
FIG. 9C is a schematic side view illustrating another example of the intersecting-direction shaft-position adjusting portion and the moving-direction shaft-position adjusting portion and illustrating a state where a shaft end in the −X direction of the first roller is located at a lowermost position in a −Z direction.

In addition, the intersecting-direction shaft-position adjusting portion 24 and the moving-direction shaft-position adjusting portion 25 can also be configured as illustrated in FIGS. 9A to 9C.

The moving-direction shaft-position adjusting portion 25 illustrated in FIGS. 9A to 9C is configured to be capable of displacing in the Y axis direction along the slide groove 28. The intersecting-direction shaft-position adjusting portion 24 is formed as an offset cam mechanism provided integrally with the moving-direction shaft-position adjusting portion 25.

The intersecting-direction shaft-position adjusting portion 24 includes an offset cam 30 and an offset cam follower 31. A bearing 29 to which the shaft end 3b of the first roller 3 is attached is provided at a position of an offset shaft of the offset cam 30. Note that FIGS. 9A to 9C illustrate different rotational angles of the offset cam 30. FIG. 9A illustrates a state where the shaft end 3b is located at an uppermost position in the +Z direction, and FIG. 9C illustrates a state where the shaft end 3b is located at a lowermost position in the −Z direction. In addition, FIG. 9B illustrates a state where a position of the shaft end 3b in the Z axis direction is located at the center in the range where the shaft end 3b moves.

The offset cam 30 is caused to rotate, and hence, the shaft end 3b moves from a position illustrated in FIG. 9A to a position illustrated in FIG. 9C. Hence, it is possible to displace the shaft end 3b in the Z axis direction. When the offset cam 30 is caused to rotate, the shaft end 3b also displaces in the Y axis direction at a position between the position in FIG. 9A and the position in FIG. 9C, that is, in a state as illustrated in FIG. 9B. However, adjustment in the Y axis direction is performed by the moving-direction shaft-position adjusting portion 25, and hence, displacement in the Y axis direction of the shaft end 3b here does not have large influence on the adjustment of a position of a shaft end.

Modified Example of Belt Detecting Unit

Figure 10:
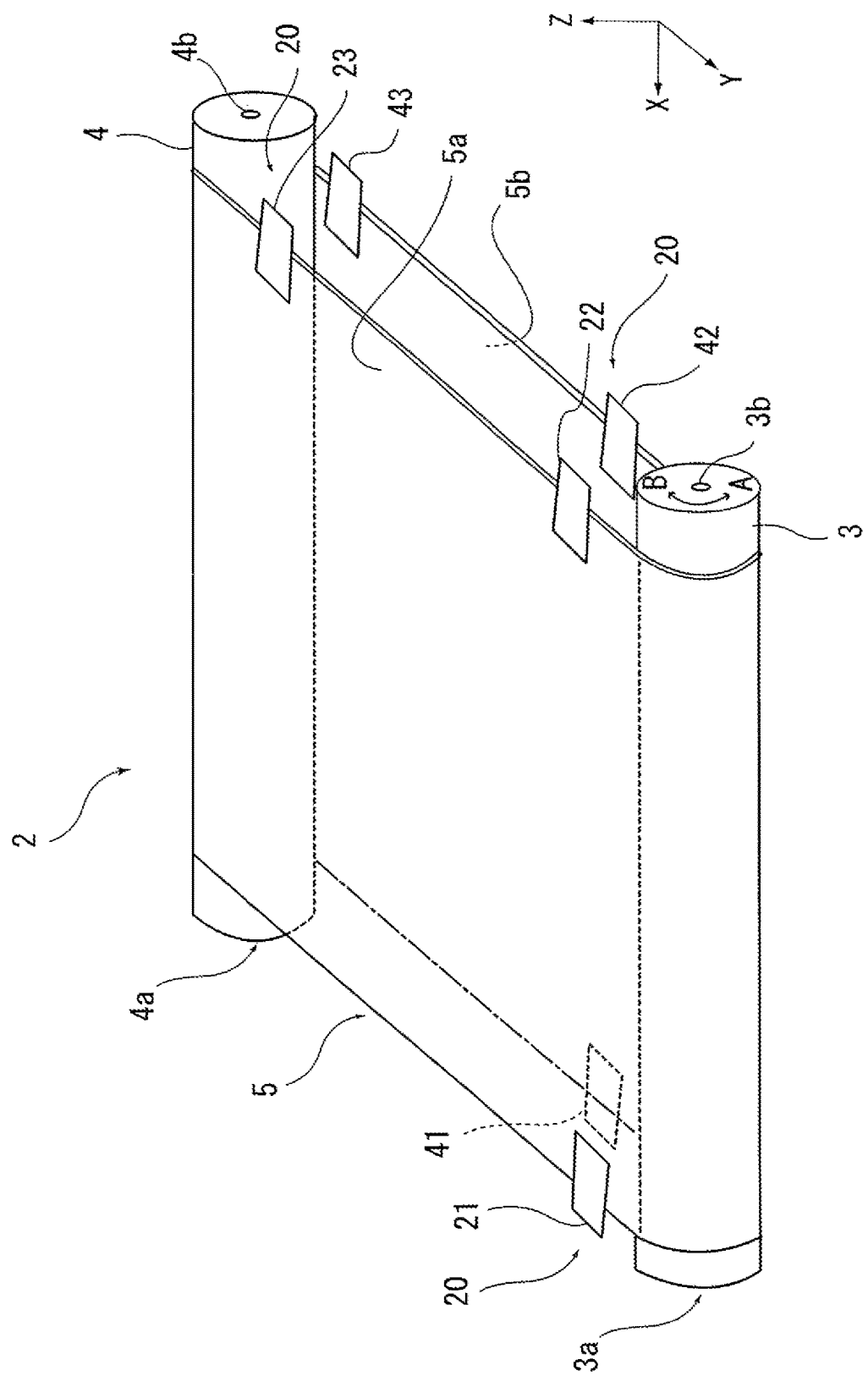
FIG. 10 is a schematic perspective view for explaining a modified example of a belt detecting unit.

Hereinafter, a modified example of a belt detecting unit 20 will be described with reference to FIG. 10. As illustrated in FIG. 10, the belt detecting unit 20 can be provided on each of a supporting surface 5a side of a conveyance belt 5 and an opposite surface 5b side of the conveyance belt 5 located on a side opposite to a supporting surface 5a with a first roller 3 and a second roller 4 being sandwiched between the supporting surface 5a side and the opposite surface 5b side.

The belt detecting unit 20 includes a first detecting portion 21, a second detecting portion 22, and a third detecting portion 23 disposed on the supporting surface 5a side of the conveyance belt 5 and configured to detect an end portion (belt side edge) in a width direction of the conveyance belt 5, and also includes a fourth detecting portion 41, a fifth detecting portion 42, and a sixth detecting portion 43 configured to detect a belt side edge on the opposite surface 5b side.

When the belt detecting unit 20 is provided only on the supporting surface 5a side, the belt detecting unit 20 detects the belt side edge pulled into the first roller 3 when the first roller 3 is caused to rotate, for example, in a first rotational direction A. However, when the first roller 3 is caused to rotate in a second rotational direction B, the belt detecting unit 20 detects the belt side edge fed from the first roller 3.

Namely, conditions for detection by the belt detecting unit 20 change depending on the rotational direction of the first roller 3.

The belt detecting unit 20 is provided on each of the supporting surface 5a side and the opposite surface 5b side of the conveyance belt 5, and hence, it is possible to use the first detecting portion 21, the second detecting portion 22, and the third detecting portion 23 configured to detect the belt side edge on the supporting surface 5a side of the conveyance belt 5 when the first roller 3 is caused to rotate in the first rotational direction A, and also use the fourth detecting portion 41, the fifth detecting portion 42, and the sixth detecting portion 43 configured to detect the belt side edge on the opposite surface 5b side when the first roller 3 is caused to rotate in the second rotational direction B.

Hence, even when the first roller 3 is caused to rotate in any of the first rotational direction A and the second rotational direction B, it is possible to use the belt detecting unit provided, for example, at the belt side edge on the side that is pulled into the first roller 3. Thus, it is possible to equalize the conditions for detection by the belt detecting unit 20 between the case where the first roller 3 is caused to rotate in the first rotational direction A and the case where the first roller 3 is caused to rotate in the second rotational direction B, and it is possible to perform detection with high reliability.

Additionally, the invention is not intended to be limited to the above exemplary embodiments, and various variations are possible within the scope of the invention as described in the appended claims. It goes without saying that such variations also fall within the scope of the invention. For example, the medium conveying device 2 described above can be mounted not only on a recording device but also to any other device including a configuration in which a sheet-type medium (including not only a roll form but also a single sheet) is conveyed.

This application claims priority under 35 U.S.C. § 119 to Japanese Patent Application No. 2018-052140, filed Mar. 20, 2018. The entire disclosure of Japanese Patent Application No. 2018-052140 is hereby incorporated herein by reference.

What is claimed is:

1. A medium conveying device comprising:
a first roller configured to be rotatable in a first rotational direction and in a second rotational direction opposite to the first rotational direction;
a second roller disposed to be spaced apart from the first roller and configured to be rotatable in the first rotational direction and in the second rotational direction;
a conveyance belt passed around the first roller and the second roller and configured to support and convey a medium on a supporting surface formed between the first roller and the second roller; and
a controlling unit configured to control at least rotary drive of the first roller, wherein
the controlling unit is configured to execute first control to determine whether a first skewing direction and a second skewing direction are the same,
the first skewing direction indicating whether, when the first roller and the second roller are caused to rotate in the first rotational direction, the conveyance belt moves toward one side or the other side in a width direction intersecting a moving direction of the conveyance belt, and
the second skewing direction indicating whether, when the first roller and the second roller are caused to rotate in the second rotational direction, the conveyance belt moves toward the one side or the other side in the width direction.

2. The medium conveying device according to claim 1, further comprising:
a belt detecting unit configured to detect movement of the conveyance belt in the width direction, wherein
the controlling unit obtains information about the first skewing direction and the second skewing direction based on a result of detection by the belt detecting unit to execute the first control.

3. The medium conveying device according to claim 2, wherein
the controlling unit obtains information about the first skewing direction based on an average value of amounts of movement of the conveyance belt in the width direction while the first roller and the second roller are caused to rotate in the first rotational direction and the conveyance belt is caused to make one turn, and
obtains information about the second skewing direction based on an average value of amounts of movement of the conveyance belt in the width direction while the first roller and the second roller are caused to rotate in the second rotational direction and the conveyance belt is caused to make one turn.

4. The medium conveying device according to claim 2, wherein
the belt detecting unit is provided at least at a position where a distance from the first roller in the moving direction is shorter than a distance from the second roller in the moving direction.

5. The medium conveying device according to claim 2, wherein
the belt detecting unit is provided at both a supporting surface-side of the conveyance belt and an opposite surface-side of the conveyance belt located on an opposite side to the supporting surface, across the first roller and the second roller.

6. The medium conveying device according to claim 1, further comprising:
an intersecting-direction shaft-position adjusting portion configured to allow at least one shaft end of four shaft ends, including a shaft end on one side and a shaft end on the other side of the first roller and a shaft end on one side and a shaft end on the other side of the second roller, to be displaceable in an intersecting direction intersecting the supporting surface of the conveyance belt, wherein
when the controlling unit determines in the first control that the first skewing direction and the second skewing direction differ from each other, adjustment of a position of a shaft end in the intersecting direction by the intersecting-direction shaft-position adjusting portion is performed.

7. The medium conveying device according to claim 6, wherein the adjustment of the position of the shaft end in the intersecting direction by the intersecting-direction shaft-position adjusting portion is performed by displacing a position of one shaft end of the four shaft ends in the intersecting direction without changing positions of three shaft ends.

8. The medium conveying device according to claim 1, further comprising:
a moving-direction shaft-position adjusting portion configured to allow at least one shaft end of four shaft ends, including a shaft end on one side and a shaft end on the other side of the first roller and a shaft end on one side and a shaft end on the other side of the second roller, to be displaceable in the moving direction, wherein
when the controlling unit determines in the first control that the first skewing direction and the second skewing direction are the same, adjustment of a position of a shaft end in the moving direction by the moving-direction shaft-position adjusting portion is performed.

9. A recording device comprising:
the medium conveying device according to claim 1; and
a recording unit configured to record on the medium supported and conveyed on the supporting surface of the conveyance belt.

10. A method for determining a skewing state of a conveyance belt in a medium conveying device including a first roller configured to be rotatable in a first rotational direction and in a second rotational direction opposite to the first rotational direction, a second roller disposed to be spaced apart from the first roller and configured to be rotatable in the first rotational direction and in the second rotational direction, and a conveyance belt passed around the first roller and the second roller and configured to support and convey a medium on a supporting surface formed between the first roller and the second roller, the method comprising:
determining whether a first skewing direction and a second skewing direction are the same,
the first skewing direction indicating whether, when the first roller and the second roller are caused to rotate in the first rotational direction, the conveyance belt moves toward one side or the other side in a width direction intersecting with a moving direction of the conveyance belt, and
the second skewing direction indicating, when the first roller and the second roller are caused to rotate in the second rotational direction, whether the conveyance belt moves toward the one side or the other side in the width direction.

\* \* \* \* \*